United States Patent Office 3,362,785
Patented Jan. 9, 1968

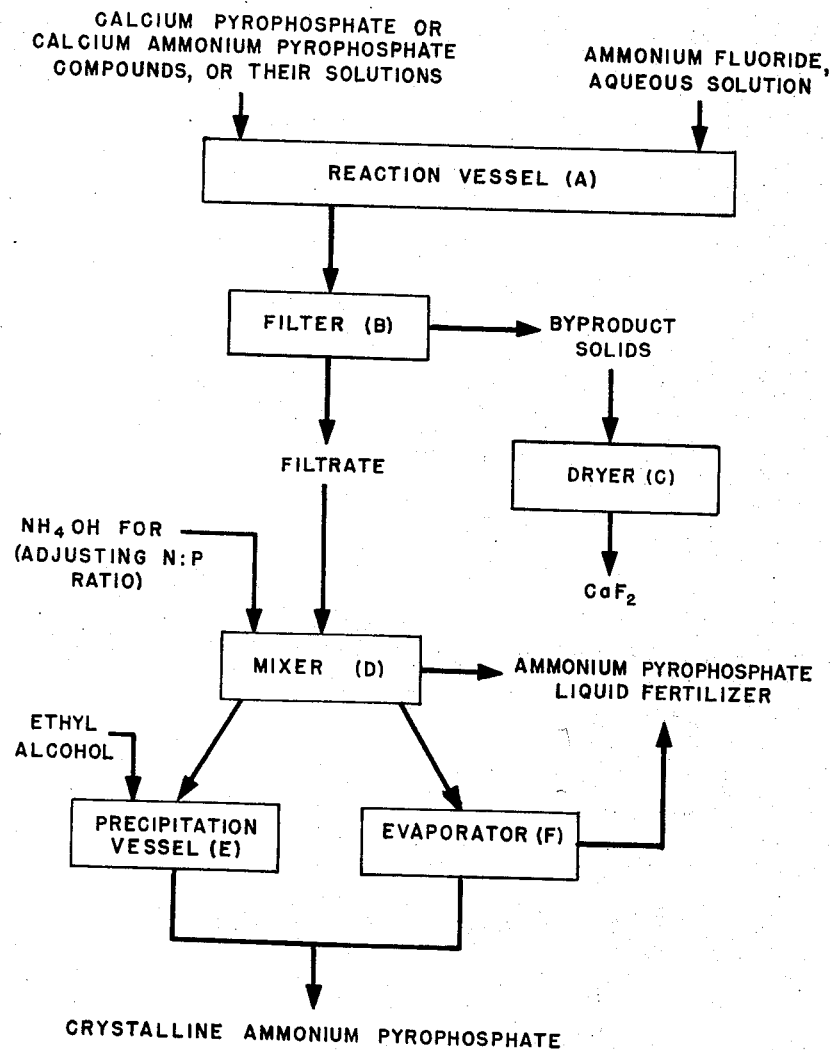

3,362,785
PRODUCTION OF AMMONIUM PYROPHOS-
PHATES AND BY-PRODUCT CALCIUM
FLUORIDE
James R. Lehr, Florence, Ala., assignor to Tennessee
Valley Authority, a corporation of the United States
Filed Apr. 20, 1964, Ser. No. 361,624
13 Claims. (Cl. 23—88)

ABSTRACT OF THE DISCLOSURE

Ammonum pyrophosphates are prepared by treating an aqueous suspension of calcium pyrophosphate or calcium ammonium pyrophosphate with an aqueous solution of ammonium fluoride. The calcium fluoride produced by the reaction is filtered off, and the ammonium pyrophosphate product is recovered from the aqueous solution by precipitation with ethyl alcohol or by evaporation and crystallization.

---

The invention herein described may be manufactured and used by or for the Government for governmental purposes without payment to me of any royalty thereon.

My invention relates to new and useful improvements in methods and processes for the preparation of ammonium pyrophosphate compounds and more particularly to a process for the preparation of ammonium pyrophosphate compounds by the reaction of calcium pyrophosphates with solutions of ammonium fluoride.

Ammonium pyrophosphates constitute a group of materials containing a high content of available plant food. For example, the compound tetraammonium pyrophosphate, which is a crystalline salt having the formula $(NH_4)_4P_2O_7$, contains 80 percent plant nutrients $(N+P_2O_5)$.

Heretofore these ammonium pyrophosphates, for example tetraammonium pyrophosphate, have received little attention in the chemical industry although they are potentially high-analysis fertilizer materials containing about 80 percent of plant nutrients. This inattention on the part of the industry is probably due to the difficulty of preparing these ammonium pyrophosphates in homogeneous form by presently known methods, even on a laboratory scale. For instance, ammonium pyrophosphates cannot be prepared as pure salts by the known methods of preparing sodium pyrophosphate and potassium pyrophosphate through the means of thermally inducing condensation of the corresponding alkali orthophosphates. It has also been reported that attempts to prepare ammonium pyrophosphates from calcium pyrophosphates by metathetical precipitation yield double salts such as calcium ammonium pyrophosphates instead of the desired ammonium pyrophosphate. In volume 1 of Phosphorus and Its Compounds by John R. Van Wazer, published in 1958 by Interscience Publishers, Inc., New York, N.Y. (pages 619 and 626), there is disclosed a laboratory procedure utilizing ion exchange resins in the (H)+ form to convert tetrasodium pyrophosphate, $Na_4P_2O_7$, to unstable pyrophosphoric acid, $H_4P_2O_7$, which must be ammoniated immediately to avoid objectionable hydrolysis of the pyrophosphoric acid in order to produce tetraammonium pyrophosphate in a form of a dilute solution from which the salt may be recovered as a solid by expensive evaporation or other concentration step.

My invention is directed to a method of producing ammonium pyrophosphates, such as tetraammonium pyrophosphate, either as highly concentrated aqueous solutions or as dry solid salts.

I have overcome the difficulties inherent in the processes of the type of the prior art to a substantial extent in the present invention by a process in one form thereof wherein ammonium pyrophosphate can be prepared in any of three desired compositions, $(NH_4)_2H_2P_2O_7$, $(NH_4)_3HP_2O_7$, or $(NH_4)_4P_2O_7$. In my process I treated calcium pyrophosphate material or a calcium ammonium pyrophosphate material with a stoichiometric amount of ammonium fluoride or ammonium acid fluoride in an aqueous medium. I have found that the specific form of the ammonium pyrophosphate product is dependent upon the pyrophosphate reagent, the amount of ammonium fluoride used, and the pH of the solution of reactants.

In addition, I have found that, in my process, the ammonium pyrophosphate can be produced in any concentration up to the limit of saturation by controlling the amount of water in the reaction medium. In my process, the reaction can be conducted at room temperature; however, the reaction proceeds more rapidly if the mixture is warm. However, care must be taken that the temperature should not approach the boiling point if hydrolysis of the pyrophosphate to orthophosphate is to be minimized. In my process, the order of combination of the reagents is not critical and it is not essential that the calcium pyrophosphate source dissolve completely in the aqueous medium because the ammonium fluoride attacks the solid particles of the calcium pyrophosphate, releases the pyrophosphate and precipitates calcium fluoride as stable agglomerates or pseudomorphs of the same physical form as the calcium pyrophosphate reagent. In my process, stirring or other agitation is needed only to the extent necessary to ensure circulation of ammonium fluoride solution to the reacting surfaces of the calcium pyrophosphate particles. In my process, the ammonium pyrophosphate product produced can be recovered from the solution either by precipitation with ethyl alcohol or by evaporation of the water.

Furthermore, several new and advantageous features over the conventional processes for the production of ammonium pyrophosphate compounds shown in the prior art are realized by the present invention.

Among these advantageous features are: (1) my process permits the production of a composition of matter which is presently not available commercially, but which is highly suitable for use as a high-analysis fertilizer or as a material for bulk blending in mixed fertilizers or as a component of concentrated liquid fertilizers; (2) my process may be used with a wide variety of commercially available raw material presently known to the fertilizer industry; (3) in my process waste byproduct fluoride which must otherwise be disposed by processors of phosphatic ores may be utilized; (4) my product yields as a byproduct thereof acid grade calcium fluoride for which there is a market demand; (5) my process yields ammonium pyrophosphates directly in solutions of any desired strength up to the limit of saturation; and finally (6) my process can be carried out under conditions of pH and temperature that minimize hydrolysis of pyrophosphate ion to the orthophosphate ion.

It is therefore an object of the present invention for the economical and direct production of ammonium pyrophosphates, either as highly concentrated aqueous solutions or as dry solid salts pure enough for either laboratory studies or commercial use.

Another object of the present invention is the economical and direct production of ammonium pyrophosphates, either as highly concentrated aqueous solutions or as dry solid salts pure enough for both laboratory studies and commercial use, and which process may utilize as raw material a variety of commercially available materials presently known to the fertilizer industry, including byproduct fluorine which must otherwise be disposed of by processors of phosphatic ores.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

My invention will be better understood from a consideration of the following description taken in connection with the accompanying drawing in which:

The drawing is a flowsheet in box form generally illustrating principles of my novel process which results in a product having the properties mentioned above.

Referring now more specifically to the drawing, section A represents any vessel suitable for containing the reaction mixture during the precipitation period. The slurry from the precipitation vessel A is fed to a filtration device B. The solids from filtration device B are fed to dryer C which discharges a dry, finely divided, acid-grade calcium fluoride. The filtrate from filtration device B is fed to a suitable mixing vessel D. As an alternate procedure, reaction vessel A may be used as a settling vessel, so that clear supernatant solution can be discharged directly to mixer vessel D, and solids drawn off to filter B, thereby reducing the load on filter B. Ammonium hydroxide, as required to adjust the N:P ratio for the precipitation of ammonium pyrophosphate of a specified composition, is added to mixer D along with the filtrate from filter B. Precipitation vessel E is any suitable container for the precipitation of product ammonium pyrophosphate by the addition of ethyl alcohol. As an alternate step, evaporator F may be used to concentrate the solution from mixer D to a dry product. The solution either from mixer D or after some concentration in evaporator F, may be used as a solution of ammonium pyrophosphate of desired strength for application as a liquid fertilizer.

Examples of the sources of calcium pyrophosphate materials that can be used are $CaH_2P_2O_7$, $$Ca_3H_2(P_2O_7)_2 \cdot 4H_2O$$

any of the four crystalline hydrates of calcium pyrophosphate ($Ca_2P_2O_7 \cdot nH_2O$, where $n$ may be either 2 or 4), and the combination of these compounds obtained by the thermal treatment of concentrated superphosphate. Examples of calcium ammonium pyrophosphate materials that can be used are $Ca_3(NH_4)_2(P_2O_7)_2 \cdot 6H_2O$, $$CaNH_4HP_2O_7$$

$Ca(NH_4)_2P_2O_7 \cdot H_2O$, the product from the hydrolysis and ammoniation of calcium polymetaphosphate which is predominantly $Ca(NH_4)_2P_2O_7 \cdot H_2O$, and the product predominantly $Ca(NH_4)_2P_2O_7 \cdot H_2O$, of the treatment of ammoniated superphosphoric acid with a calcium compound. Ammonium fluoride or ammonium acid fluoride solutions of any concentration can be used. The temperature is not critical, but it should be conducted reasonably near room temperature to avoid hydrolysis of the pyrophosphate ion to orthophosphate ion. The important considerations are the stoichiometric balance between the reactants to remove calcium as insoluble calcium fluoride without undesired excess of either calcium or fluoride ion, and stoichiometric balance between pyrophosphate ion and ammonia supplied as ammonium fluoride and ammonium hydroxide to give the proper ratio of ammonia to phosphorus for the ammonium pyrophosphate salt desired. The pH of the resulting mixtures may vary over the broad range from 2 to 7. A pH above 7 is to be avoided if possible since this leads to the precipitation of calcium fluoride in a physical form having poor filtration properties, and pH's below 2 lead to unwanted hydrolysis of pyrophosphate ion.

In order that those skilled in the art may better understand how the present invention can be practiced and more fully and definitely understood, the following examples of processes I have used in the direct production of ammonium pyrophosphates are given by way of illustration and not by way of limitation.

*Example I*

*Diammonium pyrophosphate.*—To 100 ml. of water at room temperature was added 55 grams of $CaH_2P_2O_7$ and 18.8 grams of $NH_4F$ with only enough stirring to ensure dissolution of the fluoride and mixing of the reactants. Calcium fluoride precipitated rapidly as pseudomorphs of the original pyrophosphate particles, and the reaction was complete in 5 to 10 minutes. The mixture was filtered, and the filtrate was treated with about an equal volume of ethyl alcohol, which caused the ammonium pyrophosphate to precipitate first as an oil which then crystallizes as $(NH_4)_2H_2P_2O_7$. The stoichiometry of the reaction is:

$$CaH_2P_2O_7 + 2NH_4F = (NH_4)_2H_2P_2O_7 + CaF_2$$

Virtually all the calcium was recovered as $CaF_2$.

*Example II*

*Triammonium pyrophosphate.*—To 50 ml. of water at room temperature was added 20 grams of $$Ca_3H_2(P_2O_7)_2 \cdot 4H_2O$$

and 8.2 grams of $NH_4F$, with light stirring to ensure adequate mixing. Calcium fluoride precipitated as pseudomorphs of the original pyrophosphate particles. The reaction took place at room temperature, but was hastened by warming to about 45° C. The mixture was filtered, and the filtrate had a pH of about 5.5. Alcohol was added in a volume equal to the solution, and the ammonium pyrophosphate oil precipitated and crystallized rapidly as $(NH_4)_3HP_2O_7 \cdot H_2O$. Virtually all the calcium was recovered as $CaF_2$. The stoichiometry of the reaction is:

$$Ca_3H_2(P_2O_7)_2 \cdot 4H_2O + 6NH_4F = 2(NH_4)_3HP_2O_7 \cdot H_2O + 3CaF_2$$

*Example III*

*Tetraammonium pyrophosphate.*—To 100 ml. water was added 32.6 grams of $Ca_2P_2O_7 \cdot 4H_2O$ and 14.8 grams of $NH_4F$ with only enough stirring to ensure mixing of the reagents. The mixture reacted rapidly at room temperature, but the speed could be increased by warming to about 45° C. The mixture was filtered, and the filtrate was slightly alkaline. The ammonium pyrophosphate was precipitated as an oil by addition of an equal volume of ethyl alcohol; the oil soon crystallized as $(NH_4)_4P_2O_7$. Virtually all the calcium was recovered as $CaF_2$. The stoichiometry of the reaction is:

$$Ca_2P_2O_7 \cdot 4H_2O + 4NH_4F = (NH_4)_4P_2O_7 + 2CaF_2$$

*Example IV*

*Tetraammonium pyrophosphate.*—To 250 ml. of water was added 50 grams of $Ca(NH_4)_2P_2O_7 \cdot H_2O$ and 27.5 grams of $NH_4F$ with light stirring to ensure mixing of the reactants. The reaction was rapid at room temperature, and $CaF_2$ precipitated as pseudomorphs of the pyrophosphate particles. The solution had a pH slightly above the neutral point. The mixture was filtered, and an equal volume of alcohol was added to precipitate the ammonium pyrophosphate as an oil, which then crystallized as $(NH_4)_4P_2O_7$. Virtually all the calcium was recovered as $CaF_2$. The stoichiometry of the reaction is:

$$Ca(NH_4)_2P_2O_7 \cdot H_2O + 2NH_4F = (NH_4)_4P_2O_7 + CaF_2$$

*Example V*

*Tetraammonium pyrophosphate.*—To 200 ml. of water was added 50 grams of $Ca_3(NH_4)_2(P_2O_7)_2 \cdot 6H_2O$ and 18.2 grams of $NH_4F$ with light stirring to ensure mixing of the reactants. Reaction was rapid at first, then slowed as hulls of $CaF_2$ formed on the pyrophosphate particles. Warming to about 45° C. hastened the reaction to completion in a total of about 30 minutes. The $CaF_2$ had formed as stable pseudomorphs of the same physical dimensions as the original pyrophosphate crystals, which facilitated their removal by filtration. The filtrate was slightly alkaline. Alcohol was added in about an equal volume to precipitate the oil of ammonium pyrophosphate, which then crystallized as $(NH_4)_4P_2O_7$. Virtually all the calcium was recovered as $CaF_2$. The stoichiometry of the reaction is:

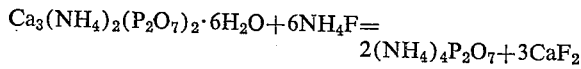

$$Ca_3(NH_4)_2(P_2O_7)_2 \cdot 6H_2O + 6NH_4F = 2(NH_4)_4P_2O_7 + 3CaF_2$$

*Example VI*

Tetraammonium pyrophosphate.—$(NH_4)_4P_2O_7$ can be prepared by the procedures outlined in Examples I and II if the pH of the filtrate is adjusted to about 7 with ammonium hydroxide. All other conditions remain the same.

*Example VII*

Tetraammonium pyrophosphate.—$(NH_4)_4P_2O_7$ can be prepared by the procedure given in Example IV, if in place of reagent-grade $Ca(NH_4)_2P_2O_7 \cdot H_2O$ there is used the crude product of similar composition obtained by precipitating the ammonium pyrophosphate fraction of ammoniated superphosphoric acid by the addition of $CaCO_3$ or other reactive calcium compounds.

*Example VIII*

Tetraammonium pyrophosphate.—$(NH_4)_4P_2O_7$ can be prepared by the procedure given in Example IV, if in place of reagent-grade $Ca(NH_4)_2P_2O_7 \cdot H_2O$ there is used the crude product of similar composition which is produced by the hydrolysis and ammoniation of vitreous calcium metaphosphate.

The precipitation of ammonium pyrophosphate by addition of ethyl alcohol is not a limiting condition, but is a means by which the pure salt is rendered insoluble while at the same time any excess ammonium fluoride remains dissolved in the alcohol fraction. The ammonium pyrophosphate solution, which can be prepared by these examples in any desired strength through adjustment of the amount of water employed, can be processed by evaporation or spray drying to obtain a solid product suitable for fertilizer use, or may be used directly as a base solution for the formulation of liquid fertilizer mixtures.

While I have shown and described particular embodiments in my invention, modifications and variations thereof will occur to those skilled in the art. I wish it to be understood, therefore, that the appended claims are intended to cover such modifications and variations that are within the true scope and spirit of my invention.

What I claim as new and desire to secure by Letters Patent of the United States is:

1. A process for the production of diammonium dihydrogen pyrophosphate, $(NH_4)_2H_2P_2O_7$, by a process which comprises the steps of reacting a monocalcium dihydrogen pyrophosphate, $CaH_2P_2O_7$, with a stoichiometric amount of an aqueous solution of ammonium fluoride, said amount of ammonium fluoride sufficient to provide a mole ratio F:Ca of 2, in a reaction vessel; subsequently removing the resulting reacted mixture from said reaction vessel; filtering said reacted mixture to remove the solid $CaF_2$ byproduct of the metathetical reaction; adding ethyl alcohol to the filtrate of said reaction mixture in approximately equal volumes therewith, said filtrate consisting essentially of an aqueous solution of diammonium dihydrogen pyrophosphate; and recovering as product the solid crystalline diammonium dihydrogen pyrophosphate.

2. A process for the production of diammonium dihydrogen pyrophosphate, $(NH_4)_2H_2P_2O_7$, by a process which comprises the steps of reacting a monocalcium dihydrogen pyrophosphate, $CaH_2P_2O_7$, with a stoichiometric amount of an aqueous solution of ammonium fluoride, said amount of ammonium fluoride sufficient to provide a mole ratio of F:Ca of 2, in a reaction vessel; subsequently removing the resulting reacted mixture from said reaction vessel; filtering said reacted mixture to remove the solid $CaF_2$ byproduct of the metathetical reaction; evaporating the water from said filtrate, said filtrate consisting essentially of an aqueous solution of diammonium dihydrogen pyrophosphate; and recovering as product the solid crystalline diammonium dihydrogen pyrophosphate.

3. A process for the production of triammonium hydrogen pyrophosphate, $(NH_4)_3HP_2O_7$, which comprises the steps of reacting a tricalcium dihydrogen pyrophosphate, $Ca_3H_2(P_2O_7)_2 \cdot 4H_2O$, with a stoichiometric amount of an aqueous solution of ammonium fluoride, said amount of ammonium fluoride sufficient to provide a mole ratio of F:Ca of 2, in a reaction vessel; subsequently removing the resulting reacted mixture from said reaction vessel; filtering said reacted mixture to remove the solid $CaF_2$ byproduct of the metathetical reaction; adding ethyl alcohol to the filtrate of said reacted mixture in approximately equal volumes therewith, said filtrate consisting essentially of an aqueous solution of triammonium hydrogen pyrophosphate which has a pH of about 5.5; and recovering as product the solid, crystalline triammonium hydrogen pyrophosphate.

4. A process for the production of triammonium hydrogen pyrophosphate, $(NH_4)_3HP_2O_7$, by a process which comprises the steps of reacting a tricalcium dihydrogen pyrophosphate, $Ca_3H_2(P_2O_7)_2 \cdot 4H_2O$, with a stoichiometric amount of an aqueous solution of ammonium fluoride, said amount of ammonium fluoride sufficient to provide a mole ratio F:Ca of 2, in a reaction vessel; subsequently removing the resulting reacted mixture from said reaction vessel; filtering said reacted mixture to remove the solid $CaF_2$ byproduct of the metathetical reaction; evaporating the water from said filtrate, said filtrate consisting essentially of an aqueous solution of triammonium hydrogen pyrophosphate which has a pH of about 5.5; and recovering as product the solid crystalline triammonium hydrogen pyrophosphate.

5. A process for the production of tetraammonium pyrophosphate which comprises the steps of reacting in a reaction vessel a calcium pyrophosphate material selected from the group consisting of monocalcium dihydrogen pyrophosphate, $CaH_2P_2O_7$, tricalcium dihydrogen pyrophosphate tetrahydrate, $Ca_3H_2(P_2O_7)_2 \cdot 4H_2O$, the 4 crystalline hydrates of calcium pyrophosphate $(Ca_2P_2O_7 \cdot nH_2O$, where $n$ may be either 2 or 4), and mixtures thereof, with a stoichiometric amount of an aqueous solution of ammonium fluoride, said amount of ammonium fluoride sufficient to provide a mole ratio F:Ca of 2; subsequently removing the resulting reacted mixture from said reaction vessel; filtering said reacted mixture to remove the solid $CaF_2$ byproduct of the metathetical reaction; adjusting the pH of said filtrate to about 7, said filtrate then consisting essentially of an aqueous solution of tetraammonium pyrophosphate; adding ethyl alcohol to the filtrate of said reacted mixture in approximately equal volumes therewith; and recovering as product the solid crystalline tetraammonium pyrophosphate, $(NH_4)_4P_2O_7$.

6. A process for the production of tetraammonium pyrophosphate which comprises the steps of reacting in a reaction vessel a calcium pyrophosphate material selected from the group consisting of monocalcium dihydrogen pyrophosphate, $CaH_2P_2O_7$, tricalcium dihydrogen pyrophosphate, $Ca_3H_2(P_2O_7)_2 \cdot 4H_2O$, the 4 crystalline hydrates of calcium pyrophosphate $(Ca_2P_2O_7 \cdot nH_2O$, where $n$ may be either 2 or 4), and mixtures thereof, with a stoichiometric amount of an aqueous solution of ammonium fluoride, said amount of ammonium fluoride sufficient to provide a mole ratio F:Ca of 2; subsequently removing the resulting reacted mixture from said reaction vessel; filtering said reacted mixture to remove the solid $CaF_2$ byproduct of the metathetical reaction; adjusting the pH of said filtrate to about 7, said filtrate then consisting essentially of an aqueous solution of tetraammonium pyrophosphate; removing the water from said filtrate through evaporation therefrom; and recovering as product the solid crystalline tetraammonium pyrophosphate, $(NH_4)_4P_2O_7$.

7. The process of claim 5 wherein ammonium hydroxide is utilized to adjust the pH of said filtrate to about 7.

8. The process of claim 6 wherein ammonium hydroxide is utilized to adjust the pH of said filtrate to about 7.

9. The process of preparing tetraammonium pyrophosphate which comprises the steps of reacting a calcium pyrophosphate material selected from the group consisting of the crystalline hydrates of dicalcium pyrophosphate ($Ca_2P_2O_7 \cdot nH_2O_2$ where $n$ may be 2 or 4), in a reaction vessel, with a stoichiometric amount of an aqueous solution of ammonium fluoride, said amount of ammonium fluoride sufficient to provide a mole ratio F:Ca of 2; subsequently removing the resulting reacted mixture from said vessel; filtering said reacted mixture to remove the solid $CaF_2$ byproduct of the metathetical reaction; adding ethyl alcohol to the filtrate of said reacted mixture in approximately equal volumes therewith, said filtrate consisting essentially of an aqueous solution of tetraammonium pyrophosphate which has a pH of about 7; and recovering as product crystalline tetraammonium pyrophosphate, $(NH_4)_4P_2O_7$.

10. The process of preparing tetraammonium pyrophosphate which comprises the steps of reacting a calcium pyrophosphate material selected from the group consisting of the crystalline hydrates of dicalcium pyrophosphate ($Ca_2P_2O_7 \cdot nH_2O$, where $n$ may be 2 or 4), in a reaction vessel, with a stoichiometric amount of an aqueous solution of ammonium fluoride, said amount of ammonium fluoride sufficient to provide a mole ratio F:Ca of 2; subsequently removing the resulting reacted mixture from said vessel; filtering said reaction mixture to remove the solid $CaF_2$ byproduct of the metathetical reaction; evaporating the water from the filtrate, said filtrate, which has a pH of about 7, consisting essentially of an aqueous solution of tetraammonium pyrophosphate; and recovering as product crystalline tetraammonium pyrophosphate, $$(NH_4)_4P_2O_7$$

11. A process for the production of tetraammonium pyrophosphate which comprises the steps of reacting a calcium ammonium pyrophosphate material selected from the group consisting of $Ca_3(NH_4)_2(P_2O_7)_2 \cdot 6H_2O$, $$CaNH_4HP_2O_7$$

$Ca(NH_4)_2P_2O_7 \cdot H_2O$, and mixtures thereof in a reaction vessel, with a stoichiometric amount of an aqueous solution of ammonium fluoride, said amount of ammonium fluoride sufficient to provide a mole ratio F:Ca of 2; subsequently removing the resulting reacted mixture from said reaction vessel; filtering said reacted mixture to remove the solid $CaF_2$ byproduct of the metathetical reaction; adjusting the pH of said filtrate to about 7, said filtrate then consisting essentially of an aqueous solution of tetraammonium pyrophosphate; adding ethyl alcohol to the filtrate of said reacted mixture in approximately equal volumes therewith; and recovering as product solid crystalline tetraammonium pyrophosphate, $(NH_4)_4P_2O_7$.

12. A process for the production of tetraammonium pyrophosphate which comprises the steps of reacting a calcium ammonium pyrophosphate material selected from the group consisting of $Ca_3(NH_4)_2(P_2O_7)_2 \cdot 6H_2O$, $$CaNH_4HP_2O_7$$

$Ca(NH_4)_2P_2O_7 \cdot H_2O$, and mixtures thereof, in a reaction vessel, with a stoichiometric amount of an aqueous solution of ammonium fluoride, said amount of ammonium fluoride sufficient to provide a mole ratio F:Ca of 2; subsequently removing the resulting reacted mixture from said reaction vessel; filtering said reacted mixture to remove the solid $CaF_2$ byproduct of the metathetical reaction; adjusting the pH of said filtrate to about 7, said filtrate then consisting essentially of an aqueous solution of tetraammonium pyrophosphate; evaporating the water from said filtrate; and recovering as product the solid, crystalline tetraammonium pyrophosphate $(NH_4)_4P_2O_7$.

13. A process for the production of calcium fluoride as byproduct from a method of producing ammonium pyrophosphates from the reaction of calcium pyrophosphates and calcium ammonium pyrophosphates, and mixtures thereof, with an aqueous solution of ammonium fluoride which comprises the steps of reacting a calcium pyrophosphate material selected from the group consisting of $CaH_2P_2O_7$, $Ca_3H_2(P_2O_7)_2 \cdot 4H_2O$, the 4 crystalline hydrates of calcium pyrophosphate ($Ca_2P_2O_7 \cdot nH_2O$, where $n$ may be either 2 or 4), $Ca_3(NH_4)_2(P_2O_7)_2 \cdot 6H_2O$, $$CaNH_4HP_2O_7$$

$Ca(NH_4)_2P_2O_7 \cdot H_2O$, and mixtures thereof, in a reaction vessel, with a stoichiometric amount of an aqueous solution of ammonium fluoride, said amount of ammonium fluoride sufficient to provide a mole ratio F:Ca of 2; subsequently removing from said reaction vessel the resulting reacted mixture, said mixture consisting essentially of a solution of ammonium pyrophosphate with a pH in the range from abount 2 to about 7 and suspended solid $CaF_2$ byproduct of the metathetical reaction; filtering said reacted mixture to separate the solid $CaF_2$ byproduct from the ammonium pyrophosphate solution; removing the resulting filter cake of $CaF_2$ from the filtering step; drying said filter cake; and recovering calcium fluoride product as said dried filter cake.

References Cited

UNITED STATES PATENTS 1,699,234    1/1929    Gaus et al.   _____ 23—88 X

FOREIGN PATENTS 297,546    9/1928    Freat Britain.

OTHER REFERENCES

"Jacobson's Encyclopedia of Chemical Reaction," volume 2, 1948 edition, page 112, Reinhold Pub. Corp., New York, N.Y.

OSCAR R. VERTIZ, *Primary Examiner.*

EDWARD STERN, *Examiner.*